United States Patent [19]

Ban

[11] Patent Number: 4,847,131
[45] Date of Patent: Jul. 11, 1989

[54] RECORDING PAPER AND CONVEYING METHOD OF THE RECORDING PAPER HAVING BOTH TRANSMISSION AREAS AND NON-TRANSMISSION AREAS

[75] Inventor: Yasuomi Ban, Tokyo, Japan
[73] Assignee: Kabushiki Kaisha Toshiba, Kawasaki, Japan
[21] Appl. No.: 173,614
[22] Filed: Mar. 25, 1988
[30] Foreign Application Priority Data Mar. 27, 1987 [JP] Japan .................................. 62-44207

[51] Int. Cl.$^4$ ......................... B65D 65/28; B41L 1/20
[52] U.S. Cl. ...................................... 428/43; 428/192; 428/537.5; 282/1 A; 282/2; 282/3 R; 282/5; 282/11.5 A; 282/12 R
[58] Field of Search ...................... 428/43, 192, 537.5; 282/1 A, 2, 3 R, 3 J, 11.5 A, 12 R

[56] References Cited

U.S. PATENT DOCUMENTS

| 2,161,144 | 6/1939 | Douglas | 282/1 A |
| 4,551,374 | 11/1985 | Holmbers | 428/43 |
| 4,627,994 | 12/1986 | Welsch | 428/43 |

FOREIGN PATENT DOCUMENTS

| 2313213 | 2/1977 | France | 282/11.5 A |
| 464467 | 4/1937 | United Kingdom | 282/1 A |
| 962052 | 6/1964 | United Kingdom | 282/11.5 A |

Primary Examiner—Ellis P. Robinson
Assistant Examiner—P. J. Ryan
Attorney, Agent, or Firm—Oblon, Spivak, McClelland, Maier & Neustadt

[57] ABSTRACT

A recording paper for use with recording meters comprises a first section having transmission areas for transmitting the driving force of sprockets or the like in the recording meter to the recording paper, and a recording area in which data is recoreded, and a second section, which does not have transmission areas. The transmission areas contain sprocket holes which are engagable with sprockets, while the second section does not have sprocket holes. The recording meter transmits the driving force of the sprockets to the recording paper through the transmission areas, to convey the recording paper and records data on the recording paper while it is being conveyed. When the second section of the recording paper reaches the sprockets, the sprockets run idle, due to the second section not having transmission areas for enabling the driving force of the sprockets to be transmitted to the recording paper. Thus, the recording paper stops, whereby a recording element is then able to record data thereon, and not on a sprocket drum or the like.

18 Claims, 4 Drawing Sheets

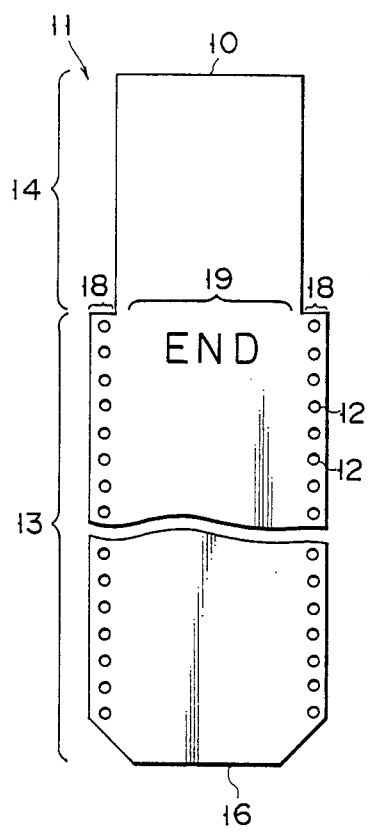
F I G. 2
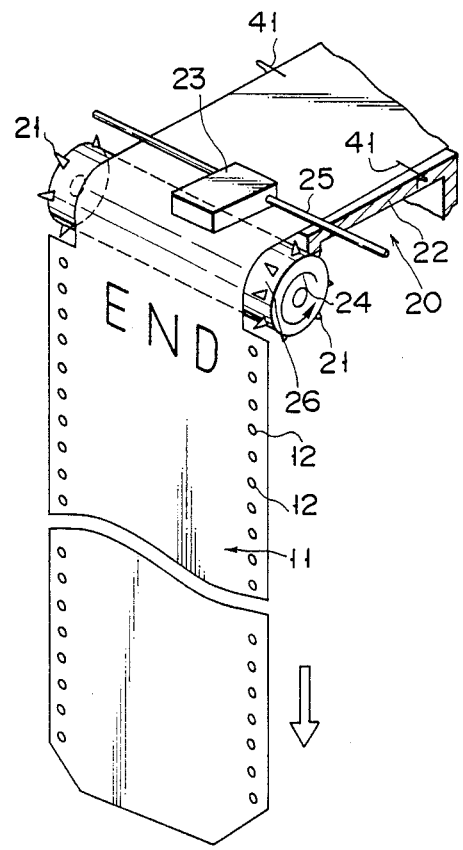
F I G. 3

RECORDING PAPER AND CONVEYING METHOD OF THE RECORDING PAPER HAVING BOTH TRANSMISSION AREAS AND NON-TRANSMISSION AREAS

BACKGROUND OF THE INVENTION

1. Field of the Invention

The present invention relates to a recording paper for use with recording meters and printers.

2. Description of the Related Art

The conventional recording paper and meter will be described with reference to FIG. 1.

Recording paper 1 has sprocket holes 2, which are engaged with teeth of sprockets 5 of the recording meter, and is conveyed in a given direction when sprockets 5 rotate.

Sprocket holes 2 are formed at regular intervals along both sides of recording paper 2, from front end portion 3 to terminal end portion 4 thereof. Therefore, recording paper 1 continues to be conveyed in the certain direction as sprockets 5 rotates. And finally, recording paper 1 drops from the recording meter, as shown in FIG. 1.

When recording paper 1 drops from the recording meter, recording element 6 is contacted with sprocket drum 7 or guide plate 8. Sprocket drum 7 and guide plate 8 are made of harder materials than recording paper 1 and have lower thermal conductivities than recording paper 1. When recording element 6 contacts with sprocket drum 7 or guide plate 8 for a long time, and continues its recording operation thereon, therefore, it will be abraded or broken. When recording element 6 is a thermal heal, heating elements of the thermal head will be over heated.

SUMMARY OF THE INVENTION

The object of the present invention is therefore to provide a recording paper which can be stopped at a desired position.

This object can be achieved by a recording paper which comprises a first section (13) on which any desired data can be recorded and having transmission areas (18) for transmitting the driving force of conveying means (21) of a recording meter to recording paper (11) and recording area (19) on which any desired recording is carried out; and second section (14) without the transmission area. The first and second sections constitute a long continuous sheet of paper. The second section is provided at a position where the recording paper is to be stopped, transmission of the recording paper thereby being stopped.

When the recording paper of the present invention formed as described above is set to a recording mater, it does not drop from the recording meter. Therefore, the recording element of the recording meter does not contact directly the sprocket drum or guide plate but usually contacts with the recording paper, thereby preventing the recording element from being broken.

The paper conveying method for recording meters according to the present invention includes the steps of preparing one continuous recording paper which has a length longer than its width and comprises a first section provided with transmission areas for transmitting the driving force of conveying means of the recording meter to the recording paper and for conveying the paper, and a second section without transmission areas for stopping the recording paper. The second section is provided at a position where the recording paper is to be stopped. Also included is the step of transmitting the driving force of the conveying means to the recording paper, through the transmission areas, to convey the recording paper continuously and recording any desired data on the recording paper while it is being conveyed continuously. Finally, data can continue to be recorded on the recording paper when the second section of the recording paper reaches the conveying means and the recording paper stops.

BRIEF DESCRIPTION OF THE DRAWINGS

FIG. 2 is intended to explain an example of the recording paper according to the present invention.

FIG. 3 is a perspective view intended to explain the movement of the recording meter on which the recording paper shown in FIG. 2 is set.

DETAILED DESCRIPTION OF THE PREFERRED EMBODIMENTS

Figure 1:
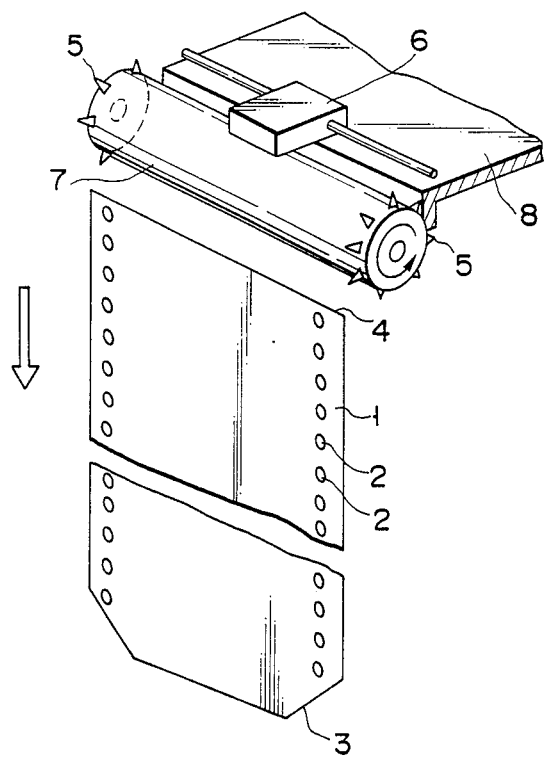
FIG. 1 is a perspective view intended to explain the conventional recording meter and paper.

An example of the recording paper according to the present invention will be described with reference to FIG. 2. Recording paper 11 comprises recording section 13 provided with sprocket holes 12 and terminal section 14 provided with no sprocket hole.

Recording section 13 includes transmission areas 18 where sprocket holes 12 are formed along both sides of recording section 13 to transmit the driving force of sprockets to recording paper 11, and recording area 19 where any optional recording can be applied. Sprocket holes 12 are regularly formed along both sides of recording section 13 at a certain interval and they are parallel to the longitudinal direction of the recording paper. They are also formed from front end portion 16 of recording paper 11 to terminal end of recording section 13 and engaged with the sprockets of a recording meter. Recording paper 11 is conveyed in a certain direction by the rotating force of the sprockets.

Terminal section 14 extends about 20cm, for example, from terminal end 17 of recording paper 11 and it is made narrower than the width between the sprockets of the recording meter, so that it can be prevented from engaging the sprockets, but it is made wider than the width of that area of recording paper 11 where a recording element of the recording meter can move. In other words, terminal section 14 is formed by removing transmission areas 18 from recording section 13.

The recording meter which uses recording paper 11 may be any of the well-known ones. A basic arrangement of the recording meter on which recording paper 11 is set will be described with reference to FIG. 3. Recording meter 20 includes sprockets 21, guide plate 22 and recording element 23. Sprockets 21 are engaged with sprocket holes 12 and rotated in a direction as shown by an arrow to feed recording paper 11 under recording element 20. Guide plate 22 guides not-still-used recording paper 11 to sprockets 21. Recording element 23 moves along rod 25 to record any optional data and information on recording paper 11.

The operation of recording meter 20 which uses recording paper 11 of the present invention will be described.

The operator sets recording paper 11 on recording meter 20. Not-still-used recording paper 11 is set folded or like a roll, for example, on the back of recording paper. Sprocket holes 12 of recording paper 11 are engaged with sprockets 21 and recording paper 11 is fed the front face of recording meter 20 at a certain speed. Recording element 23 is under the control of a control section (not shown) and moves along rod 25 to record data on recording paper 11.

When the recording advances and terminal section 14 reaches sprockets 21, sprockets 21 are released from sprocket holes 12, as shown in FIG. 3. Sprockets 21 run idle and their rotating force is not transmitted to recording paper 11 accordingly. Since terminal section 14 is still left on guide plate 22, recording paper 11 will not drop from recording meter 20 because of its own weight. Recording paper 11 can be thus stopped on guide plate 22.

Even when recording paper 11 is stopped, recording element 23 continues its recording movement. However, terminal section 14 is made wider than the width of that area of recording paper 11 on which recording element 23 can move.

When recording paper 11 is used, therefore, recording element 23 cannot be contacted directly with sprocket drum 26 or the like, thereby causing recording element 23 to be less broken down or damaged, as compard with the conventional cases.

Figure 4:
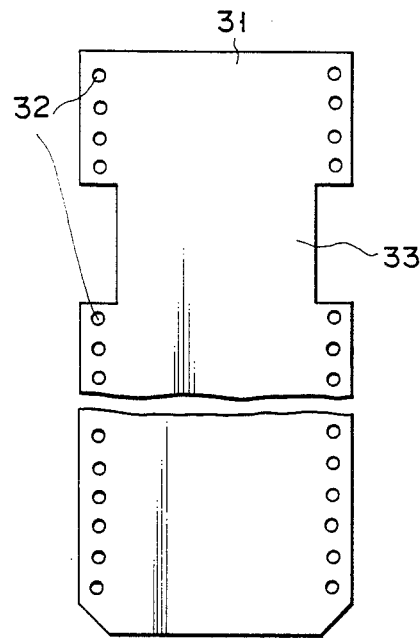
FIGS. 4 through 9 are intended to explain other examples of the recording paper according to the present invention.

Although no sprocket hole has been formed at terminal section 14 of recording paper 11 in the above-described example, the present invention is not limited to the above example. Section 22 having no sprocket hole may be formed on the way of recording paper 31, as shown in FIG. 4. This section having no sprocket hole can be arranged on the recording paper at any position thereof, depending upon how the recording paper is used.

Figure 5:
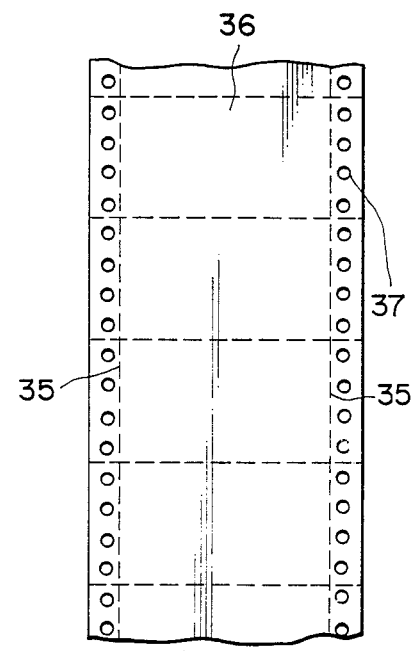
Figure 6:
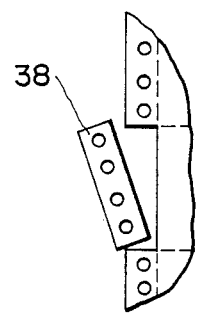

Although the section having no sprocket hole has been previously formed on the recording paper in the case of the above-described examples, the user may remove the sprocket holes from the recording paper at any optional position thereof. For the purpose of making it easy for the user to remove the sprocket holes, perforated lines 35 may be provided along both sides of recording paper 36, as shown in FIG. 5. When edge 38 at a desired position is removed as shown in FIG. 6, any optional sprocket holes 37 can be removed from recording paper 36.

When sprockets are released from sprocket holes in the case of the above-described examples, recording paper may drop from the recording meter because of its own weight or because the frictional force between the sprocket drum and the recording paper is quite small. Therefore, such paper holders 41 as shown in FIG. 3 may be added to the recording meter to prevent the recording paper from dropping from the recording meter.

Figure 7:
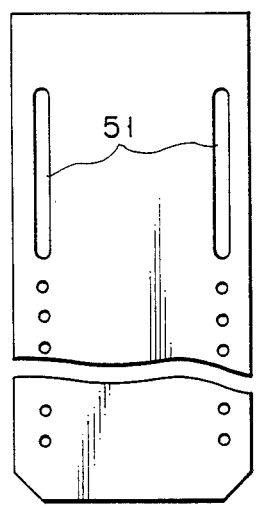

Although a part of the recording paper has been made narrower to allow sprockets 21 to run idle in the case of the above-described examples, slits 51 may be formed along both sides of the recording paper at any optional position thereof, as shown in FIG. 7. The sprockets thus run idle in slits 51, thereby enabling same effect as those in the above-described examples to be achieved.

Figure 8:
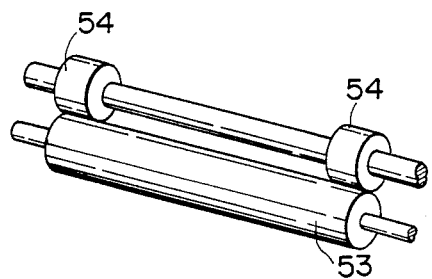
Figure 9:
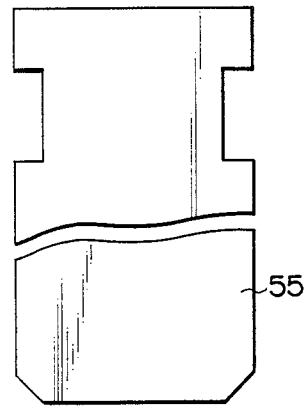

Although description has been made about those recording papers for use with the recording meters which have the sprockets, the present invention is not limited to the recording papers. In a case where the paper feeding mechanism of the recording meter comprises platen roller 53 and rollers 54 contacted and rotated with platen roller 53, for example, as shown in FIG. 8, recording paper 55 has no sprocket hole but when it is formed as shown in FIG. 9, same effect as those in the above-described examples can be achieved.

An end mark may be added to the recording paper, as shown in FIGS. 2 and 3, to make it easy for the operator to confirm that recording paper 11 is stopped.

When the above-described recording papers are used, they can be still left under the recording element even when they would be conventionally expected to drop from the recording meter. The recording element cannot be contacted therefore directly with the sprocket drum or guide plate, thereby preventing the recording element from being broken or damaged.

What is claimed is:

1. A paper conveying method for recording meters, comprising steps of:
    preparing one continuous recording paper which has a length longer than its width and comprises a first section provided with transmission areas for transmitting the driving force of conveying means of the recording meter to the recording paper and for conveying this paper, and a second section, without transmission areas for stopping said recording paper, the second section being provided at a position where the recording paper is to be stopped;
    transmitting the driving force of said conveying means to said recording paper, through the transmission area, to convey said recording paper continously and recording any desired data on said recording paper while it is being conveyed continuously; and
    continuing to record the desired data on said recording paper when said second section of the recording paper reaches said conveying means and the recording paper stops.

2. The paper conveying method for recording meters, according to claim 1, whereby said conveying means include engaging members and said transmission areas have holes engageable with said engaging members of the conveying means, to transmit the driving force of said conveying means to the recording paper, and said second section has no engaging holes.

3. The paper conveying method for recording meters, according to claim 2, whereby said second section is made narrower in width than said first section.

4. The paper conveying method for recording meters, according to claim 2, whereby said second section is made wider in width than that area of the recording paper where a recording means performs recording.

5. The paper conveying method for recording meters, according to claim 2, whereby said second section is provided with slits whose length is greater than diameter of the engaging holes in the longitudinal direction of said recording paper, said engaging members being allowed to run idle in said slits.

6. The paper conveying method for recording meters, according to claim 1, whereby said second section is formed adjacent to an end portion of said recording paper.

7. The paper conveying method for recording meters, according to claim 2, further comprising a step of forming a recording paper provided with said engaging holes formed continuously along perforated strips on either side thereof, said perforated strips or portions thereof being easy to detach from the recording paper at any desired position thereof; and a step of forming said second section such that portions of the perforated strips on either side thereof are removed.

8. The paper conveying method for recording meters, according to claim 1, whereby said recording paper has at least one mark for indicating that said second section has reached said conveying means.

9. A recording paper used to embody the matters claimed in claim 1.

10. A recording meter on which is set the recording paper according to claim 9.

11. A recording paper comprising:
a first section having transmission areas provided with hole means for engaging with engaging members of conveying means of a recording meter, and transmitting the driving force of said conveying means to the recording paper, and a recording area in which any desired data can be recorded, said hole means being formed at regular intervals along both sides of said first section of the recording paper; and
a second section made narrower in width than said first section, said second section being without hole means for transmitting the driving force of said conveying means to the recording paper, wherein:
said first and second sections constitute a continuous sheet of paper; and
said second section is provided at a position where the recording paper is to be stopped, the transmission of the recording paper thereby being stopped.

12. A recording paper comprising:
a first section on which any desired data can be recorded and which has transmission areas for transmitting the driving force of conveying means of a recording meter to the recording paper; and
a second section without the transmission areas wherein;
said first and second sections constitute a long continuous sheet of paper; and
said second section is provided at a position where the recording paper is to be stopped, transmission of the recording paper thereby being stopped.

13. The recording paper according to claim 12, whereby said transmission areas have holes engageable with engaging members of the conveying means, to transmit the driving force of said conveying means to the recording paper, but said second section has no such engaging hole.

14. The recording paper according to claim 12, wherein said second section has no holes for engaging with the engaging members of said conveying means in the recording meter to transmit the driving force of said conveying means to the recording paper.

15. The recording paper according to claim 13, wherein said second section has a width greater than that of that area of said recording paper where a recording means of the recording meter records any desired data.

16. The recording paper according to claim 13, wherein said second section is formed adjacent to the terminal end of said recording paper.

17. The recording paper according to claim 12, wherein said second section is formed such that engaging holes are formed continuously formed in perforated sections on either side of the recording paper, and portions of the perforated section are removed to remove the certain number of the engaging holes from the recording paper.

18. The recording paper according to claim 12, wherein said recording paper has a certain mark for displaying that said second section has reached the conveying means.

* * * * *